:::: {.columns}
::: {.column}
(12) United States Patent
White et al.

(54) INTEGRAL FILTER RETAINING RACK

(71) Applicant: REVOLVER 26 INVESTMENT CORPORATION, Phoenix, AZ (US)

(72) Inventors: Paul White, Calgary (CA); Lindsey Leckelt, Sherwood Park (CA); Dan Leckelt, Edmonton (CA); Neil Merkel, Spruce Grove (CA); Ryan Vetsch, Fort Saskatchewan (CA)

(73) Assignee: REVOLVER 26 INVESTMENT CORPORATION, Phoenix, AZ (US)

( * ) Notice: Subject to any disclaimer, the term of this patent is extended or adjusted under 35 U.S.C. 154(b) by 211 days.

(21) Appl. No.: 15/629,023

(22) Filed: Jun. 21, 2017

(65) Prior Publication Data

US 2017/0363318 A1 Dec. 21, 2017

Related U.S. Application Data

(60) Provisional application No. 62/352,692, filed on Jun. 21, 2016.

(51) Int. Cl.
*F24F 13/28* (2006.01)
*B01D 46/00* (2006.01)
*B01D 46/12* (2006.01)

(52) U.S. Cl.
CPC .......... *F24F 13/28* (2013.01); *B01D 46/002* (2013.01); *B01D 46/0002* (2013.01); *B01D 46/0005* (2013.01); *B01D 46/0009* (2013.01); *B01D 46/12* (2013.01)

(58) Field of Classification Search
None
See application file for complete search history.
:::

::: {.column}
(10) Patent No.: US 10,465,941 B2
(45) Date of Patent: Nov. 5, 2019

(56) References Cited

U.S. PATENT DOCUMENTS

| 2,108,283 | A |   | 2/1938 | Drew |        |
|-----------|---|---|--------|------|--------|
| 3,042,213 | A | * | 7/1962 | Bub  | B01D 46/12 |
|           |   |   |        |      | 210/323.1 |
| 3,552,104 | A | * | 1/1971 | Wood | E04B 9/22 |
|           |   |   |        |      | 454/284 |

(Continued)

FOREIGN PATENT DOCUMENTS

| EP | 2218490      | 8/2010 |
|----|--------------|--------|
| WO | WO2015123454 | 8/2015 |

OTHER PUBLICATIONS

International Search Report for PCT/US2017/038474 dated Sep. 1, 2017.
Written Opinion for PCT/US2017/038474 dated Sep. 1, 2017.

*Primary Examiner* — Christopher P Jones
*Assistant Examiner* — Brit E. Anbacht
(74) *Attorney, Agent, or Firm* — Hueschen and Sage

(57) ABSTRACT

The invention pertains to a filter retaining assembly which is rigid and self-supportive without requiring any additional structural reinforcement. The design maximizes the filter surface to be used for air filtration and increases the filtration efficiency. The invention is also designed to minimize the filter assembly size to fit into the valuable space when the air handling unit physical dimension is constrained. The invention uses integral construction methods to save assembly time and labor by eliminating the need of using alignment holes and fastening each individual frame to construct a conventional filter retaining assembly. The proposed method maintains flexibility of scaling to any filter size and quantity.

8 Claims, 5 Drawing Sheets
:::
::::

(56) References Cited

U.S. PATENT DOCUMENTS

| | | | | |
|---|---|---|---|---|
| 4,197,099 | A * | 4/1980 | Lundberg | B01D 46/02 55/378 |
| 4,555,255 | A * | 11/1985 | Kissel | B01D 46/00 55/355 |
| 8,048,186 | B2 * | 11/2011 | Mann | F02C 7/052 55/483 |
| 8,052,770 | B2 * | 11/2011 | Ayshford | B01D 46/0005 55/483 |
| 8,105,409 | B2 * | 1/2012 | Mann | B01D 46/0005 55/483 |
| 2004/0163370 | A1 * | 8/2004 | Haufe | B01D 46/0005 55/483 |
| 2010/0192528 | A1 * | 8/2010 | Mann | B01D 46/0005 55/483 |
| 2012/0311978 | A1 * | 12/2012 | Crabtree | A01K 1/0047 55/385.2 |
| 2013/0318936 | A1 * | 12/2013 | Ball | B01D 46/001 55/483 |
| 2015/0000236 | A1 * | 1/2015 | Yang | B01D 46/0019 55/482 |
| 2016/0339375 | A1 * | 11/2016 | Sweet | B01D 46/0005 |
| 2017/0050135 | A1 * | 2/2017 | Aota | F02C 7/052 |
| 2018/0345193 | A1 * | 12/2018 | Graves | B01D 46/0004 |

\* cited by examiner

INTEGRAL FILTER RETAINING RACK

FIELD OF THE INVENTION

The present disclosure relates in general to the assembly of an integral filter retaining rack to hold and secure air filters, not limited to specific sizes and types. The disclosure focuses on the design and assembly of the filter retaining rack for air handling unit application.

BACKGROUND

Air handling systems require air filtration to remove foreign particulates prior to supplying air to an area. Filters also protect expensive components within the air ventilating unit. The air filtration system is generally composed of air filters available in various sizes, and an assembly which retains the filter(s) in place. Air filters are inserted into sized cavities of the assembly, secured in place with retainers and sealed against the assembly to prevent air bypassing or leaking around the filters.

Conventional filter retaining assemblies are designed for nominal filter sizes. Filter nominal sizes are larger than the actual physical dimensions, and designing filter cavities based on nominal sizes instead of actual dimensions leads to a larger than needed foot print and poses challenges when faced with air handling unit size restrictions. Prior art air filter retaining assemblies are constructed by welding corner pieces for one individual filter cavity frame. Assembly filter cavities are lined with a gasket where air filters are held against the frame to provide sealing. Each cavity includes retainers along the sides of the frame to hold and secure air filters in place. The individual frames are aligned through the use of indentations or guide holes on each frame and fastened together using rivets, screws or other fasteners. Additionally, larger filter assemblies typically require stiffener bars, leading to additional use of equipment and time. The installation of stiffener bars on the assembly may blank off sections of filters where the full effective face of the filter array is not utilized and therefore efficiency is reduced.

When faced with dimensional constraints for an air handling unit with specific performance requirements, there is a need to keep filter rack assemblies as compact as possible to fit into the unit. This is particularly true as filter racks are usually one of the main driving factors of air handing units' cross sectional dimensions. Therefore, there is a need for a more compact and rigid filter assembly to fit into the valuable space within the physical confines of the air handling unit.

OBJECTS OF THE INVENTION

It is an object of the invention to design a filter retaining assembly which is rigid and self-supportive without requiring any additional structural reinforcement. The design maximizes the filter surface to be used for air filtration and increases the filtration efficiency. The invention is also designed to minimise the filter assembly size to fit into the valuable space when the air handling unit physical dimension is constrained.

The invention uses an integral construction method to save assembly time and labor by eliminating the need of using alignment holes and fastening each individual frame to construct a conventional filter retaining assembly. The proposed method maintains flexibility of scaling to any filter size and quantity.

SUMMARY OF THE INVENTION

An integral filter retaining rack consisting of two (2) side bars and two (2) end bars to form an outer assembly frame, and one (1) or multiple hem slot bars and one (1) or multiple brake slot bars interlocked together to define filter compartments.

Such an integral filter retaining rack, further comprising filter retention methods selected from clips, tabs, latches and other means typical in the industry.

Such an integral filter retaining rack, wherein the hem slot bar is formed from one (1) single sheet of material and consists of a double-panel flat body with two (2) flanges distal to a bend end of the flat body, and one (1) or multiple slots cut through both flange(s) into the flat body.

Such an integral filter retaining rack, wherein the brake slot bar is formed from one (1) single sheet of material and consists of a double-panel flat body with two (2) flanges distal to a bend end of the flat body, and wherein one (1) or multiple slots are cut through the bend end into the flat body, and end slot(s) are cut through both ends of the flat body at the flanges, and further comprising two (2) end flanges.

Such an integral filter retaining rack, wherein the hem slot bar and brake slot bar are designed such that they interlock at the slots to provide a strong rigid connection.

Such an integral filter retaining rack, wherein the flange of the side bar is inserted into the end slot of the brake slot bar to connect and provide a strong rigid connection.

Such an integral filter retaining rack, wherein the assembly is self-supportive and requires no structural reinforcement.

Such an integral filter retaining rack, wherein the interlocking of the side bars, end bars, hem slot bars and brake slot bars forms filter compartments which may be engineered to actual physical filter sizes.

Such an integral filter retaining rack, wherein the assembly and filter compartments may be scaled to any quantity of filter(s).

Such an integral filter retaining rack, wherein the assembly may be scaled to fit various sizes of filters.

DETAILED DESCRIPTION

The embodiments of the invention include an integral filter retaining rack consisting of two (2) side bars and two (2) end bars to form an outer assembly frame, and one (1)

or multiple hem slot bars and one (1) or multiple brake slot bars interlocked together to define filter compartments.

In one embodiment, a hem slot bar is formed from a single sheet material and consists of a double-panel flat body with two (2) flanges distal to a bend end of the flat body, and one (1) or multiple slots cut through both flanges into the flat body. A brake slot bar is formed from a single sheet material and consists of a flat body with two flanges distal to a bend end of the flat body, and one (1) or multiple slots cut through the bend end into the flat body. The brake slot bar further consists of two (2) end flanges and end slots cut through both ends of the flat body at the flanges to mate with the outer frame of the retaining assembly.

The hem slot bar(s) and the brake slot bar(s) interlock at the slots and are fastened to the outer frame to form an array of filter compartments that are sized for actual physical filter sizes. The interlocking of the hem slot bar(s) and brake slot bar(s) is rigid and self-supportive, requiring no structural reinforcement. Interiors of filter compartments are lined with a gasket along the flanges, and a filter retention method typical in the industry is provided on the interior sides of the filter compartment. The assembly may be scaled to any quantity of filter(s) and fit various sizes of filters.

In general terms, the disclosure presents an integral filter retaining rack utilizing a construction method which allows the assembly to be rigid and self-supported without the addition of structural reinforcement, and without unnecessarily blocking airflow with structural reinforcement. The overall dimension of the integral filter retaining rack is smaller than prior art racks in which individual filter racks are fastened together to form an array. Individual filters are installed and sealed in separate compartments, and are easily fitted and removed without requiring use of tools. The integral filter retaining rack can be constructed to fit various filter sizes and scaled to hold any number of filters.

Figure 1:
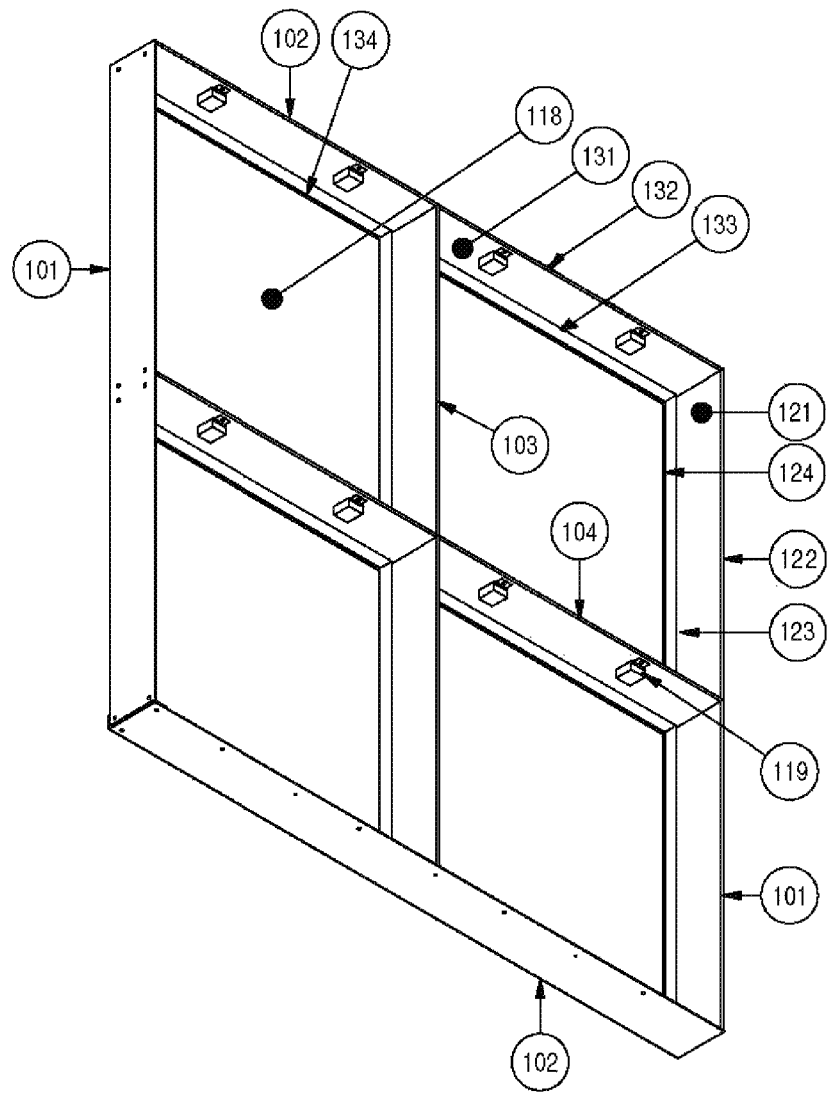
FIG. 1 is an isometric view of the integral filter retaining rack composed of multiple filter cavities to form the assembly array.

A representative embodiment comprises two (2) side bars 101 and two (2) end bars 102 to form a rectangular frame as depicted in FIG. 1. The side bars 101, encompass a flat body 121 comprising a front end 122 and a back end 123, and a single flange 124 bent 90° inward from the back end 123 of the flat body 121. The end bars 102, encompass a flat body 131 comprising a front end 132 and a back end 133, and a single flange 134 bent 90° inward from the back end 133 of the flat body 131.

Figure 2:
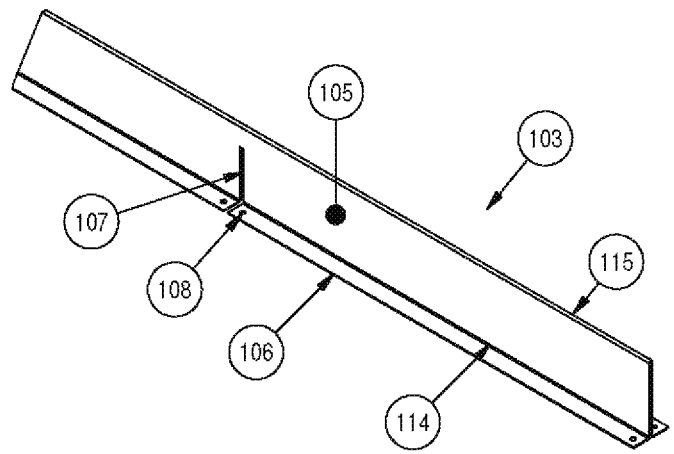
FIG. 2 is a partial view of the hem slot bar of the frame assembly according to one embodiment of the invention.

A hem slot bar 103 and a brake slot bar 104 are engineered to be assembled in an interlocking fashion spanning the space formed within the side and end bars. The hem slot bar 103, as depicted in FIG. 2, encompasses a flat body 105 of a double panel profile comprising a bending end 115 and a back end 114, and two (2) flanges 106 bent 90° outwards from the back end 114 of the flat body 105. The hem slot bar also comprises one (1) or multiple slots 107 cut from the back end 114 through both the flanges 106 into the double-panel flat body 105. Assembly holes 108 are strategically punched through the flanges 106 for assembly stage fastening.

Figure 3:
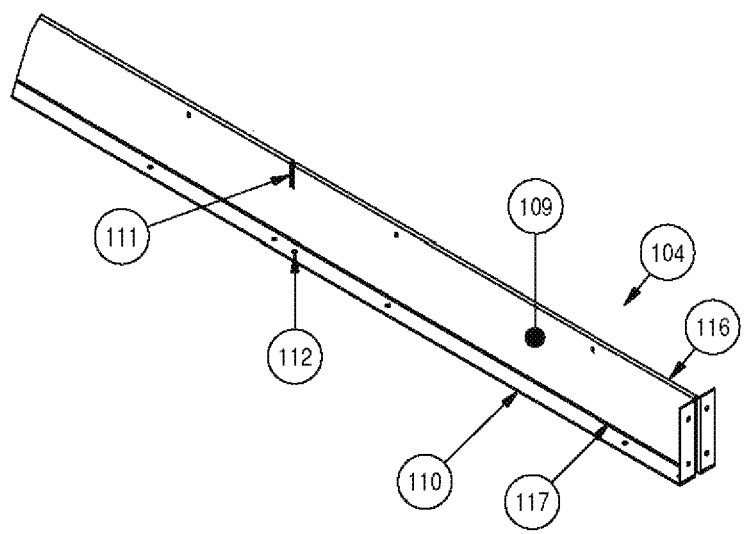
FIG. 3 is a partial view of the brake slot bar of the frame assembly according to one embodiment of the invention.
Figure 4:
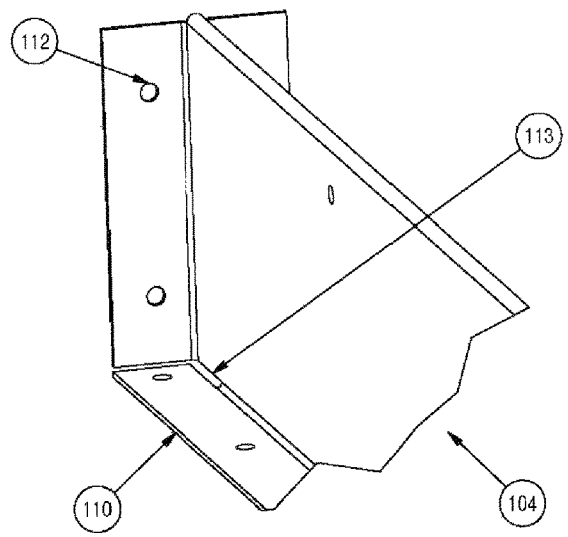
FIG. 4 is an enlarged partial sectional view of the brake slot bar end of the frame assembly to depict another embodiment of the interlocking construction feature.

The brake slot bar 104, depicted in FIG. 3, comprises a flat body 109 of a double panel profile comprising a bending end 116 and a back end 117, and two (2) flanges 110 bent 90° outwards from the back end 117 of the flat body 109. The brake slot bar also comprises of one (1) or multiple slots 111 located at the bending end 116 of the double-panel flat body 109. Assembly holes 112 are strategically punched through the flanges 110 and the face of the double-panel flat body 109 for fastening in the air handler during installation. The brake slot bar 104 includes end slots 113 on both ends of the bar and is notched along the back end 117 of the double-panel flat body 109 and the flange 110, as depicted in FIG. 4. The length of the end slot 113 is precisely determined so flange 124 of the side bar 101 sits inside the end slot 113.

Figure 5:
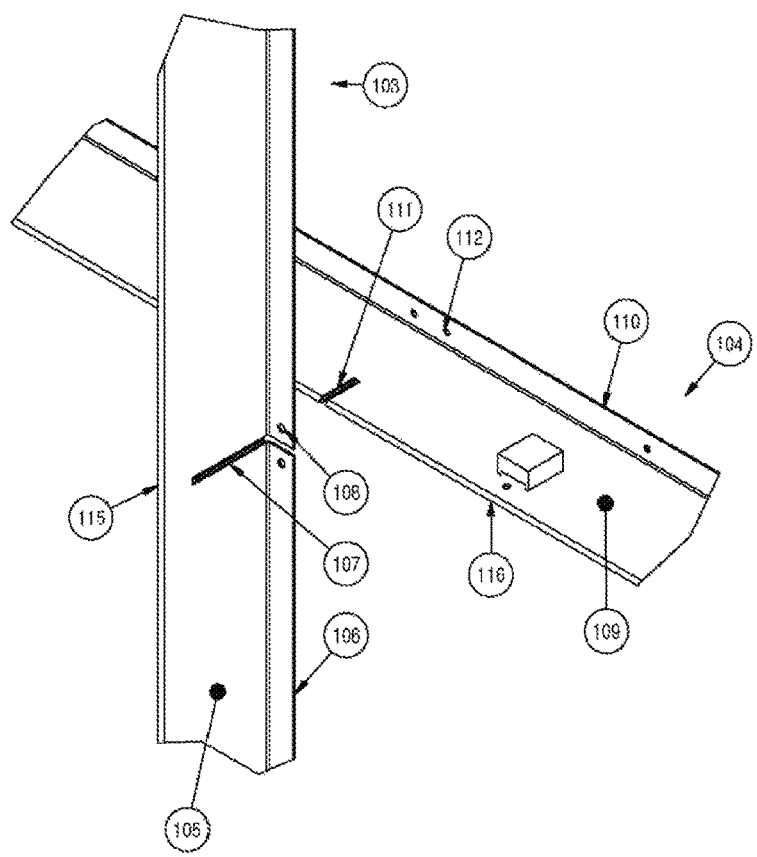
FIG. 5 is a perspective view of the embodiment of the hem and brake slot bars fitting together.

The hem and brake slot bars are interlocked in such a way so that the flat body 105 of the hem slot bar is inserted into the slot 111 of the brake slot bar, and the flat body 109 of the brake slot bar is mated into the slot 107 of the hem slot bar as depicted in FIG. 5. The slots of both bars are specifically engineered for a strong and firm interlocking connection. The width of the hem slot bar flat body 105 is determined so that the bending end 115 is flush with the bending end 116 of the brake slot bar after interlocking. The slots 107, 111 also serve as an alignment guide so no pilot holes are required for alignment. The interlocking functionality provides a strong connection due to restricted movement in two perpendicular planes, and the double-panel construction of each of the flat bodies 105, 109.

Figure 6A:
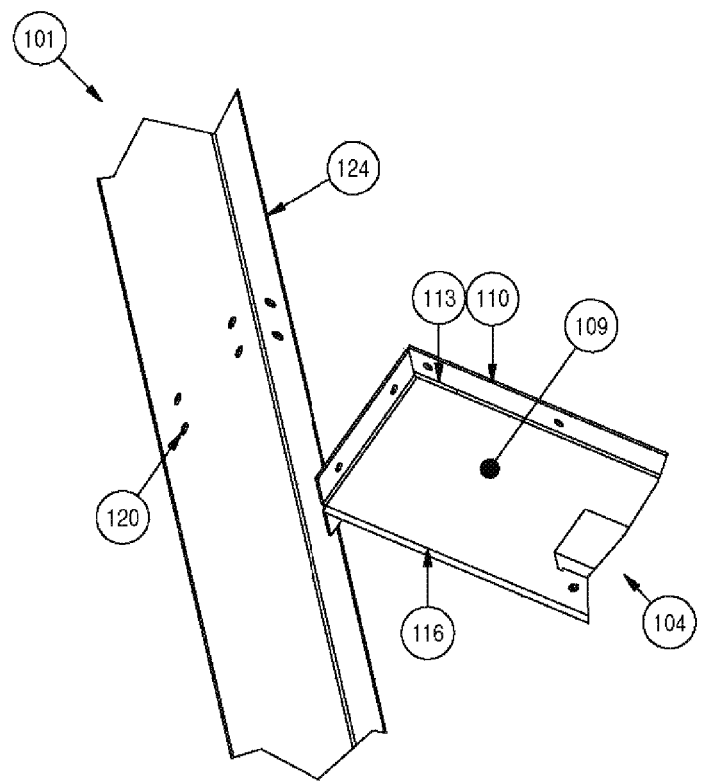
FIG. 6A is a perspective view of the joining of the brake slot bar and the side bar of the frame.
Figure 6B:
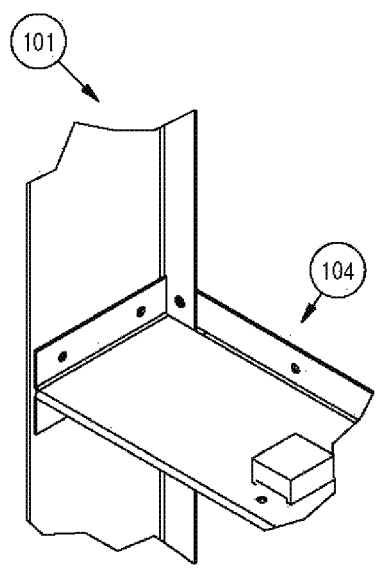
FIG. 6B is a partial view of the fitted end section of the brake slot bar and the side bar of the frame assembly.

The flange 124 of the side bar 101 is inserted into the end slot 113 of the brake slot bar 104 to form a connection between the brake slot bar and perimeter of the frame, as depicted in FIGS. 6A and 6B. When assembled, the side bar 101 and the brake slot bar 104 are perpendicular to each other, and the flange 124 is seated entirely inside the end slot 113. Having the flange 124 inserted into the end slot 113 instead of overlapping with the distal side of flange 110, reduces the required depth of the side bar 101 to provide a flush alignment to the bending end 116, therefore reducing the depth of the integral filter retaining rack.

The assembly pieces are fastened together through assembly holes 108, 112, 120 to secure and form a rigid and complete assembly that may be fastened to the inner walls of an air handling unit through the side bars 101 and end bars 102. The interlocking design and fasteners together provide a rigid and firm connection to form a self-supported integral filter retaining rack, with no welding or additional reinforcement required.

Figure 7:
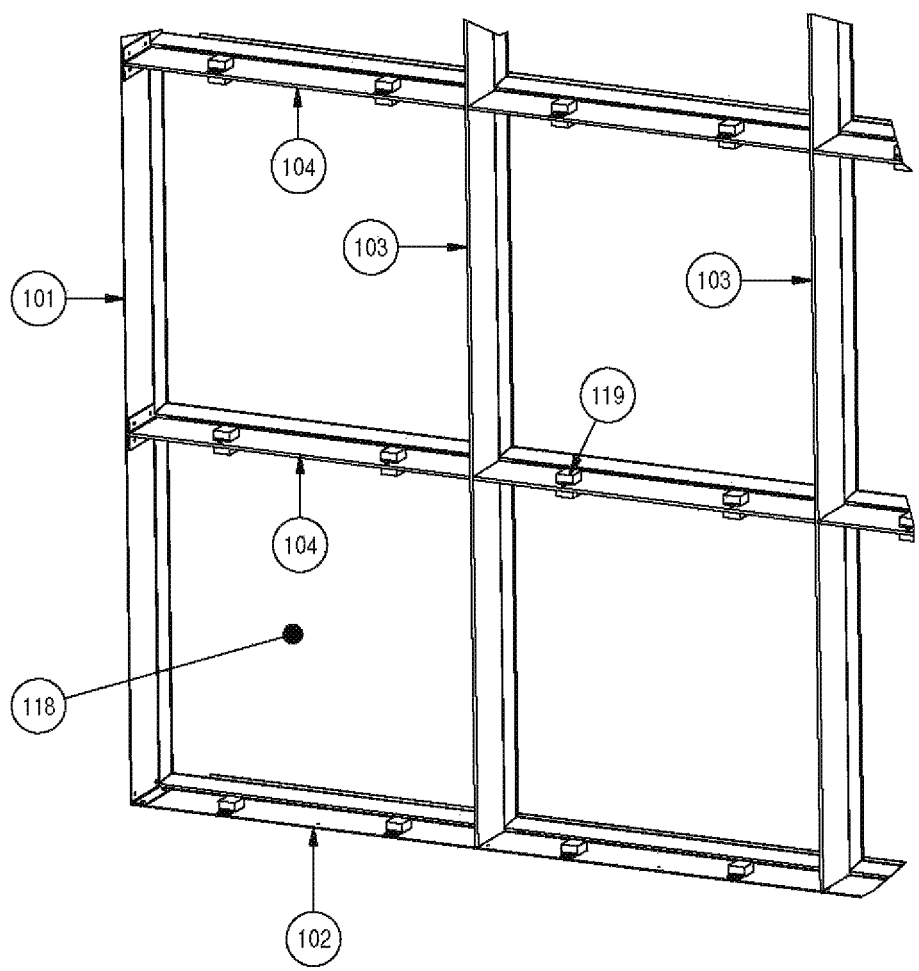
FIG. 7 is an isometric view illustrating the scalability of the integral filter retaining rack assembly.

The integral filter retaining rack eliminates the need to fasten individual filter frames to assemble an array, therefore reduces time, labour, and cost of the assembly. This advantage becomes more pronounced as the filter array becomes larger. Typical commercial filter frame cavities are designed for nominal filter sizes, while each individual compartment 118 of the integral filter retaining rack is sized to the actual physical dimension of each filter which is typically smaller than the nominal dimensions, thus reducing the overall dimension of the filter assembly, as depicted in FIG. 7. The interlocked bars in the integral filter retaining rack also provide structural rigidity so that the integral filter retaining rack is self-supported and no additional reinforcement is required. The integral filter retaining rack is capable of securing filters in place using various retention methods. One exemplary retention method is using multiple securing tabs 119 fastened onto the flat bodies in each individual filter compartment, as depicted in FIG. 7.

The described integral filter retaining rack may be scaled to fit any number of filters as depicted in FIG. 7. The side bars 101 and end bars 102 are sized to the required overall dimension of the filter assembly. The length of each hem slot bar 103 and brake slot bar 104 can be increased or decreased to accommodate the overall dimension of the frame. The number of slots 107 and 111 on the hem and brake slot bars is determined by the required number of filter compartments and array arrangement. As the assembly size increases, the number of interlocking connections increases and maintains the structural rigidity.

The size of each individual filter compartment 118 is determined by the distance between slots on the hem 103 and brake 104 slot bars. Therefore, the integral filter retaining rack can be constructed to fit various sizes of filters by adjusting the distance of the bar slots.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All patents, applications, publications, test methods, literature, and other materials cited herein are hereby incorporated by reference.

What is claimed is:

1. An integral filter retaining rack consisting of two (2) side bars and two (2) end bars to form an outer assembly frame, and one (1) or multiple hem slot bars and one (1) or multiple brake slot bars interlocked together to define filter compartments; wherein the hem slot bar is formed from one (1) single sheet of material consists of a double-panel flat body with two (2) flanges distal to a bend end of the flat body, and one (1) or multiple slots cut through both flange(s) into the flat body; or wherein the brake slot bar is formed from one (1) single sheet of material and consists of a double-panel flat body with two (2) flanges distal to a bend end of the flat body, and wherein one (1) or multiple slots are cut through the bend end into the flat body, and end slot(s) cut through both ends of the flat body at the flanges, and further comprising two (2) end flanges.

2. The integral filter retaining rack of claim 1, further comprising filter retention methods selected from clips, tabs, latches and other means typical in the industry.

3. The integral filter retaining rack of claim 1, wherein the hem slot bar and brake slot bar are designed such that they interlock at the slots to provide a strong rigid connection.

4. The integral filter retaining rack of claim 1, wherein the flange of the side bar is inserted into the end slot of the brake slot bar to connect and provide a strong rigid connection.

5. The integral filter retaining rack of claim 1, wherein the assembly is self-supportive and requires no structural reinforcement.

6. The integral filter retaining rack of claim 1, wherein the interlocking of the side bars, end bars, hem slot bars and brake slot bars forms filter compartments which may be engineered to actual physical filter sizes.

7. The integral filter retaining rack of claim 1, wherein the assembly and filter compartments may be scaled to any quantity of filter(s).

8. The integral filter retaining rack of claim 1, wherein the assembly can be scaled to fit various sizes of filters.

* * * * *